March 30, 1965     E. BOBARB     3,175,837
VEHICLE STABILIZER SYSTEM
Filed April 7, 1961     3 Sheets-Sheet 1
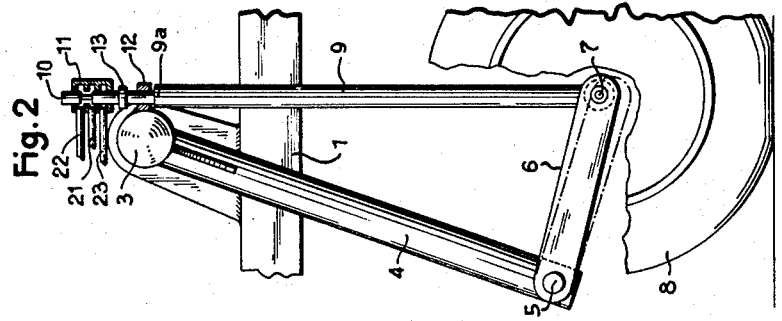
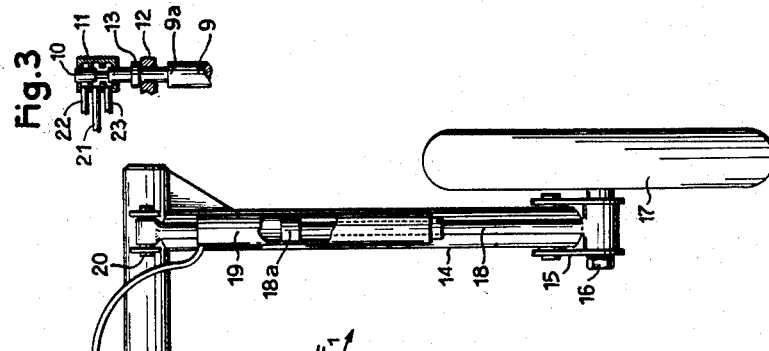
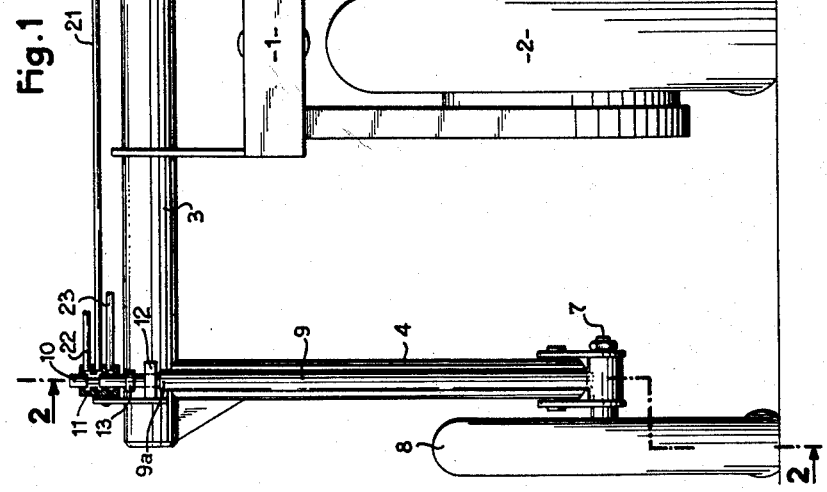

March 30, 1965  E. BOBARB  3,175,837
VEHICLE STABILIZER SYSTEM
Filed April 7, 1961  3 Sheets-Sheet 2
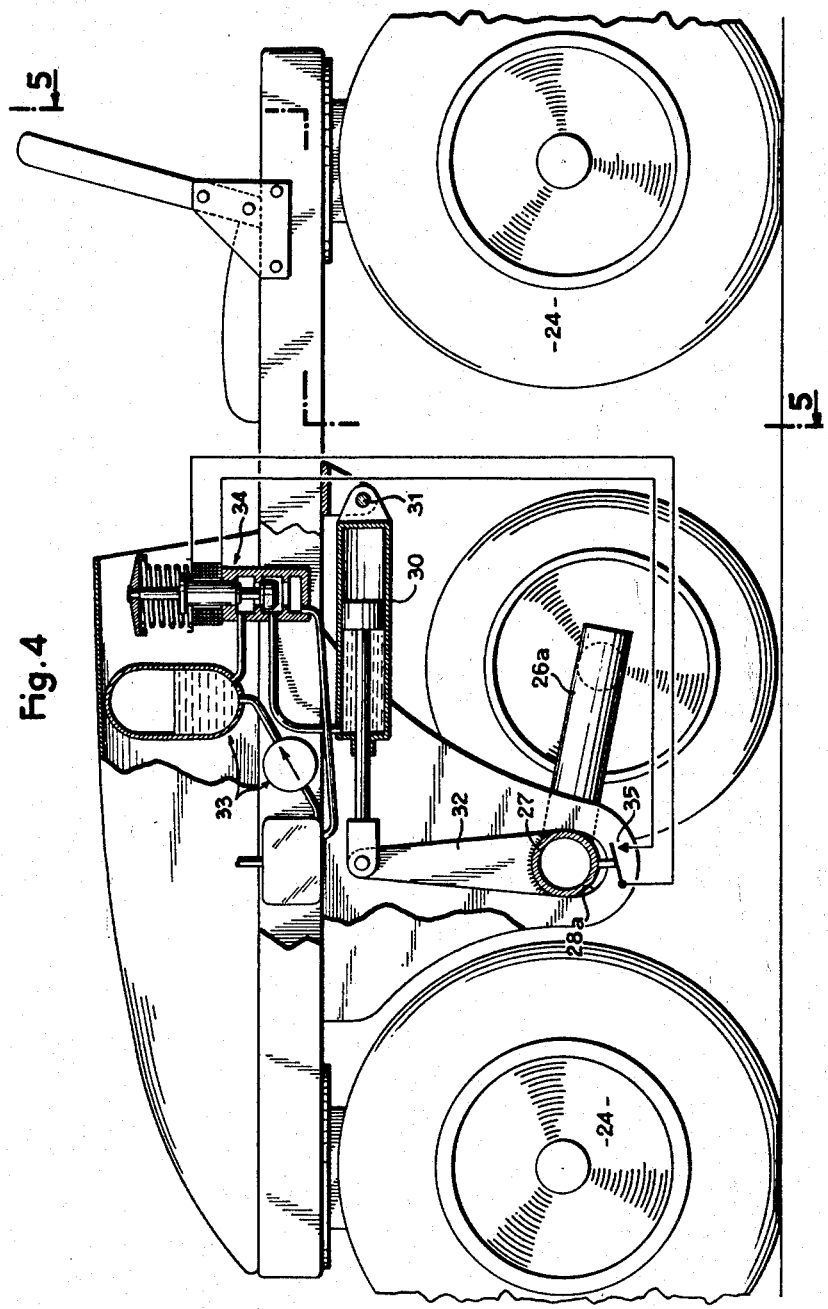

United States Patent Office 3,175,837
Patented Mar. 30, 1965

3,175,837
VEHICLE STABILIZER SYSTEM
Emile Bobard, 17 Rue de Reon, Beaune, France
Filed Apr. 7, 1961, Ser. No. 101,595
Claims priority, application France, Apr. 9, 1960, 823,946,
Patent 1,261,431
7 Claims. (Cl. 280—6.1)

This invention relates to stabilizer systems for improving the lateral stability and balance of vehicles.

There are various circumstances where the lateral stability of conventional vehicles may be dangerously impaired. In a curve, centrifugal force may tend to upset the vehicle outwardly of the curve. When an off-the-road vehicle, especially one of narrow gauge, is being driven in hilly country along a course approximating a contour line, the lateral balance may be extremely delicate, with a strong tendency for the vehicle to be upset downhill.

It is a general object of the invention to provide a lateral vehicle stabilizer system which will greatly enhance driving safety in any of the above or similar circumstances. An object is to provide a system that will immediately sense any tendency to lateral unbalance in a vehicle and operate power means for positively and automatically restoring the balance. An object is to provide a lateral stabilizer system especially applicable to off-the-road vehicles such as tractors but applicable as well to other types of motor-driven behicles. An object is to provide such a system that will be relatively simple, rugged and reliable and will use a small number of parts that are generally standard components of conventional hydraulic (or pneumatic) power equipment for vehicles.

The invention in one aspect provides a lateral stabilizer system for a vehicle, which comprises means connecting the vehicle frame with each of two transversely spaced side wheels of the vehicle so as to permit limited differential displacement between the frame and each side wheel in a generally vertical direction, means sensing the occurrence of such differential relative displacement indicative of lateral unbalance of the vehicle frame, and power means acting in response to the sensing means to produce a relative displacement between the frame and wheels in a sense to counteract the sensed differential relative displacement and restore balance of the vehicle frame.

The invention will now be described for purposes of illustration but not of limitation with reference to two specific embodiments thereof wherein the invention is applied to farming tractors. It is to be expressly understood however that the invention will be of equal use in connection with other types of off-the-road vehicles for various civilian and military uses, and more broadly is applicable to any type of vehicle.

In the accompanying drawings:

FIG. 1 is a front view of one embodiment of a tractor embodying a stabilizer system of the invention;

FIG. 2 is a partial side view on line 2—2 of FIG. 1;

FIG. 3 is a fragmentary view showing the fluid control valve of FIGS. 1 and 2 in a different operating condition;

FIG. 4 is a side view of a tractor embodying a different form of improved stabilizer system.

Figure 5:
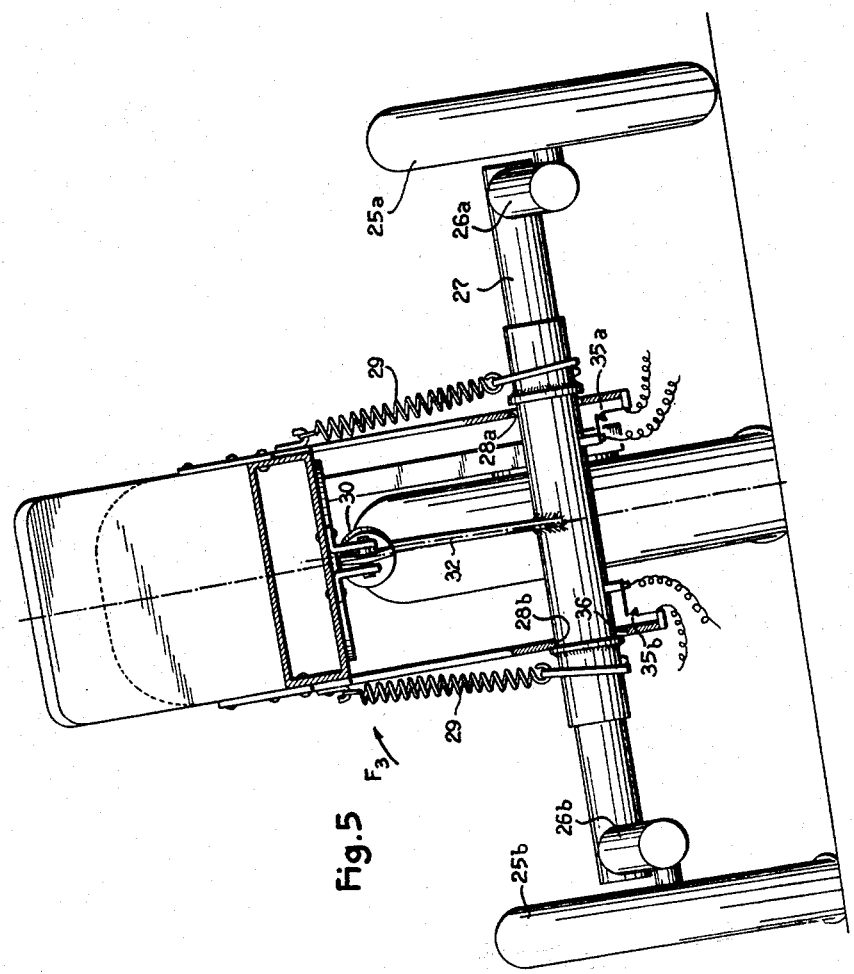
FIG. 5 is a front view on line 5—5 of FIG. 4, with the vehicle being shown on a transversely sloping surface.

The drawings are simplified showings, illustrating only the parts of the vehicle necessary for an understanding of the invention.

Referring first to FIGS. 1–3, this shows a conventional type of farming tractor including a frame 1 mounted on a pair of longitudinally spaced, aligned main wheels, only the front one of which is shown at 2. At least one of the wheels 2 is driven from the vehicle engine. The vehicle further includes a laterally displaced stabilizer wheel 8 and a compensator wheel 17 generally symmetrically opposed to wheel 8, these wheels being mounted as follows.

The frame 1 includes a transverse frame member or crossbar 3 and depending from each end of the crossbar is a deformable triangular linkage having the related side wheel 8 or 17 journalled on its lower end. Specifically, considering the linkage relating to stabilizer wheel 8, this includes an arm 4 secured to the related end of crossbar 3 and extending generally in a downward direction, and a pair of parallel spaced links 6 pivoted at 5 to the lower end of arm 4. Pivoted to the free end of links 6 is an upwardly extending link 9 constituting the third side of the triangular linkage and slidably extending through a lug 12 projecting from arm 3. A spindle or axle 7 is secured to the lower end of link 9 and has the wheel 8 journalled on it. The upper end of link 9 beyond lug 12 provides the slidable spool member 10 of a conventional control valve the casing 11 of which is secured to arm 3. Thus, on deformation of the triangular linkage described to alter the vertical spacing between the frame member 3 and stabilizer wheel 8, the link 9 moves up or down relatively to crossbar 3, thereby modifying the fluid circuit connections established by valve 11 as will be later described.

On the other side of the vehicle, the deformable triangular linkage carrying compensator wheel 17 is of a generally similar character and includes an arm 14 secured to crossbar 3 and having a pair of parallel spaced links 15 pivoted to it. In this case, the third, vertical, side of the triangular linkage is provided in the form of a pressure fluid actuator including a piston rod 18 pivoted to the free end of links 14 and having a spindle 16 secured to its lower end with the wheel 17 journalled on it. The piston rod 18 terminates in a piston 18a slidable in a cylinder 19 pivoted at its upper end at 20 on the crossbar 3. The actuator is of the single-acting type, with a fluid line 21 connected with its upper end only.

A suitable source of pressure fluid, such as a pump (not shown) driven from the engine of the vehicle, is provided at an appropriate location on the vehicle and is connected in a generally conventional fluid power circuit with the actuator cylinder 19 and valve 11. As shown, valve 11 has an inlet connection 23 leading to the pressure source (not shown), an outlet connection 22 leading to the reservoir or sump, and a motor connection 21 leading to the upper end of cylinder 19. The valve spool 10 is formed with a groove such that in one end poisition of the valve spool 10 relative to valve casing 11, as in FIGS. 1 and 2, cylinder connection 21 is connected with exhaust 22, while in the other end position, shown in FIG. 3, cylinder connection 21 is connected with the inlet 23.

In operation, under normal driving conditions the load of the tractor is applied along a vertical line positioned somewhere between the main wheels 2 and the stabilizer wheel 8 i.e. somewhat left of center in FIG. 1, so that the stabilizer wheel 8 is applied firmly against the ground and consequently the under surface of lug 12 bears against a shoulder surface 9a provided on link 9. In this normal condition the valve spool 10 establishes the connections shown in FIGS. 1 and 2 wherein the upper end of actuator cylinder 19 is connected with exhaust 22, so that no pressure is applied to the upper face of piston 18a. In these conditions the compensator wheel 17 is floatingly suspended from the frame through the actuator 18–19 and rests idly on the surface of the ground so as to follow freely any irregularities in said surface. However, should the resultant load on the tractor frame become shifted from its normal position so as to approach, or pass beyond, the longitudinal midplane of the wheels 2, so that the vehicle tends to sway as indicated by arrow F1, the vertical spacing between frame member 3 and wheel 8 will increase, and the link 9 will move downwardly relative to said frame member, altering the relative position between spool 10 and the casing of valve 11 to the position shown in FIG. 3, the relative displacement in this direction being limited by abutment of a stop 13 of spool 10 against lug 12. In this position (see FIG. 3), communication is established between cylinder connection 21 and pressure inlet 23, thereby applying fluid pressure to the upper chamber of cylinder 19. The piston rod 18 is thereby expanded downwardly, and the vertical spacing between the frame member 3 and compensator wheel 17 is increased correspondingly with the increase sensed in the vertical spacing between said frame member and wheel 8. In this way, the lateral balance of the vehicle is restored.

It is noted that the compensator wheel 17 can be made quite lightweight since it is not required to bear the load of the vehicle or rest for long periods of time on the ground, nor does said compensator wheel have to be positional symmetrical with the stabilizer wheel 8 but may be arranged at any desired distance from the central main wheels 2.

However, according to a preferred form of the invention, not illustrated, the two side wheels 8 and 17 may be made completely symmetrical in function and structure, and the central wheels 2 may if desired be dispensed with, as would be the case, for example, in a conventional four-wheeled motor vehicle. In such case, the wheels on each side of the car may be provided with a power actuator such as 18–19 and with a control valve such as 11 so that the tilting of the vehicle to one side will immediately call forth a displacement of an actuator restoring the lateral trim or balance of the vehicle. In one especially desirable modification of this embodiment of the invention a differential hydraulic coupling may be provided between the two actuators provided on the opposite sides of the frame. More specifically, each of the actuators such as 18–19 provided on each side of the frame would be provided in the form of a double acting actuator, and the upper end of the cylinder on one side actuator would be interconnected with the lower end of the cylinder on the other side actuator. Thus tilting of the frame to one side, tending to cause an expansion of the actuator on the other side, would immediately call forth an expansion of the actuator on said one side, thus cancelling the incipient tilt.

The embodiment illustrated in FIGS. 4 and 5 shows a tractor vehicle having the two longitudinally spaced and aligned main wheels 24, one of which is driven from the vehicle engine, and two symmetrical, laterally spaced stabilizer wheels 25a and 25b. These stabilizer wheels are journalled on the outer ends of a common cranked axle 27, supported transversely of the vehicle frame and formed with the parallel crank arms 26a and 26b at their outer ends from which the wheels 25a and 25b are journalled through suitable spindles. The axle 27 is supported in transversely spaced bearings 28a and 28b of the frame, said bearings being provided somewhat elongated in a vertical direction as shown, to permit of a limited vertical displacement of the axle 27 to alter bodily the vertical elevation or spacing between the frame and both side wheels 25a and 25b, as well as a limited tilting or swaying of the axle 27 relatively to the frame. A pair of tension springs 29 having their ends attached to the opposite sides of the frame and to the axle 27 serve resiliently to maintain the axle in a normal transverse position relative to the frame.

A pressure fluid actuator includes a cylinder 30 pivoted at one end at 31 to the frame and a piston and piston rod the outer end of which is pivoted to a lever arm 32 having its lower end secured to the axle 27 substantially at the midpoint of the latter. One end of cylinder 30 is connected by way of a control valve 34 to a pressure reservoir 33 (see FIG. 4) supplied with pressure fluid from a pump or the like, not shown. Valve 34 is here shown as being solenoid controlled, its operating solenoid being connected in an electric supply circuit, not shown, including a pair of contacts 35a and 35b. Each of these contacts includes a contact element secured to axle 27 and another element secured to the frame, the arrangement being such that one pair of contacts, e.g. 35a, is closed to energize the valve 34 when the axle 27 is tilted relatively to the frame in a corresponding direction, e.g. as shown, in the direction to increase the vertical spacing between the frame and wheel 25a, due to the effect of gravity caused by the transverse slope of the ground surface. Closure of contacts 35a or 35b energizes the solenoid of valve 34 to operate said valve to apply pressure fluid to one side of fluid actuator 30, thereby rotating arm 32 and axle 27 in a direction to raise the frame relatively to the axle, and this applies to the frame through the bearing 28b an erecting couple as indicated by arrow F3 which restores the frame to its normal upright position, whereupon both contacts 35a and 35b are opened and the actuator is deenergized.

What I claim is:

1. A vehicle having a frame; wheels supporting the frame including principal load carrying wheels arranged one behind the other and two balancing side wheels spaced transversely from said principal wheels at the opposite sides of the latter; deformable first and second triangular linkages depending from the opposite sides of the frame and rotatably supporting the respective side wheels from a lower end thereof, each linkage including a generally vertical link of variable effective length for modifying the vertical spacing between the frame, and related side wheel; a fluid pressure actuator including cylinder and piston members respectively attached to the frame and one of said side wheels and forming said variable-length link of said first linkage; a source of pressure fluid; a fluid control valve including two relatively movable parts respectively connected with said frame and with said variable-length link of said second linkage; and fluid flow means interconnecting said source, actuator and valve into a fluid power circuit whereby a variation in length of said link of said second linkage indicative of lateral unbalance of the vehicle about said principal wheels operates the control valve to cause the actuator to produce a variation in length of said link of the first linkage in a similar sense to restore the balance of the vehicle.

2. In a vehicle, the combination of
   (A) a frame;
   (B) principal load-carrying wheels supporting said frame and at least one of which is motor driven to propel the vehicle over the ground,
       (a) said principal wheels being arranged so as to define a support area about which the vehicle is substantially unstable in the lateral direction with a vertical plane passing through the center of gravity of the vehicle being disposed at one side of said support area of the principal wheels when the latter engage level ground and have their planes of rotation perpendicular to the level ground, whereby the vehicle tends to overturn laterally toward said one side of the principal wheels; and
   (C) a lateral stabilizer system for preventing overturning of the vehicle while maintaining the planes of rotation of said principal wheels substantially perpendicular to the ground, said stabilizer system including
       (a) first and second ground engageable balancing members transversely spaced from said principal wheels at said one side and at the opposite side, respectively, of said support area of the principal wheels so that said vertical plane passing through the center of gravity normally lies between said support area and said first balancing member, (b) mounting means connecting said frame and balancing members and permitting differential displacement between said frame and each of said balancing members in a generally vertical direction, (c) power operated means connected to said mounting means for at least said second balancing member to effect generally vertical displacement of the latter relative to said frame, and (d) control means for said power operated means which control means is automatically responsive to differential vertical displacement of at least said first balancing member with respect to said frame, (1) said control means causing the power operated means to position said second balancing member to avoid substantial load-carrying contact of the latter with the ground so long as lateral instability of the vehicle tends to overturn the latter toward said one side, which overturning is prevented by load supporting contact of said first balancing member with the ground for maintaining the planes of rotation of the principal wheels perpendicular to the ground, and (2) said control means causing said power operated means to move said second balancing member downwardly relative to said frame into load-carrying contact with the ground in response to a predetermined downward differential displacement of said first balancing member relative to said frame upon the occurrence of a tendency of the vehicle to overturn toward the other side of said support area of the principal wheels, thereby to avoid overturning toward said other side while continuing to maintain the planes of rotation of said principal wheels substantially perpendicular to the ground.

3. In a vehicle, the combination as in claim 2; wherein said principal load-carrying wheels are arranged one behind the other, and said first and second balancing members are respectively constituted by auxiliary wheels.

4. In a vehicle, the combination as in claim 2; wherein said mounting means for the first balancing member includes an element connected with the latter to move substantially vertically therewith relative to said frame, and means limiting the upward and downward movement of said element with respect to said frame at positions where said first balancing member is engageable with the ground while said planes of rotation of the principal wheels depart only slightly from perpendiculars to the ground; said power operated means includes a cylinder and a piston slidable therein respectively connected to said frame and said second balancing member to move the latter downwardly into said load-carrying contact with the ground upon the supplying of fluid under pressure to said cylinder; and said control means includes a source of fluid under pressure, fluid flow means connecting said source with said cylinder, and valve means interposed in said fluid flow means and connected with said element of the mounting means to permit fluid under pressure to enter said cylinder from said source when said element is at the limit of its downward movement relative to the frame and to relieve the pressure in said cylinder when said element is at the limit of its upward movement relative to the frame.

5. In a vehicle, the combination as in claim 2; wherein said mounting means for the balancing members includes a laterally extending axle having parallel crank arms at its opposite ends to which said first and second balancing members are respectively connected, and bearing means supporting said axle with respect to said frame and permitting turning of said axle about its longitudinal axis and limited swaying of said axle with respect to the frame; said power operated means includes a cylinder and a piston slidable therein respectively connected to said frame and axle to cause turning of the latter in the direction moving said balancing members downwardly with respect to the frame upon supplying of fluid under pressure to said cylinder; and said control means includes a source of fluid under pressure, fluid flow means connecting said source with said cylinder, valve means interposed in said fluid flow means and selectively operable to permit fluid under pressure to enter said cylinder and to relieve the pressure in said cylinder, and actuating means for said valve means responsive to swaying of the axle relative to the frame and causing the latter to relieve the pressure in said cylinder when said axle is in a normal position with respect to the frame and to permit the entry of fluid under pressure into said cylinder upon swaying of said axle from said normal position.

6. In a vehicle, the combination as in claim 5; wherein said actuating means for the valve means includes a solenoid, an electrical circuit means for energizing said solenoid to cause said valve means to permit the entry of fluid under pressure into said cylinder, and normally open switch means interposed in said circuit means and being closed in response to swaying of said axle from said normal position.

7. In a vehicle, the combination of (A) a frame;

(B) principal load-carrying wheels supporting said frame and at least one of which is motor driven to propel the vehicle over the ground, (a) said principal wheels being arranged so as to define a support area about which the vehicle is substantially unstable in the lateral direction with a vertical plane passing through the center of gravity of the vehicle being disposed at one side of said support area of the principal wheels when the latter engage level ground and have their planes of rotation perpendicular to the level ground, whereby the vehicle tends to overturn laterally toward said one side of the principal wheels; and (C) a lateral stabilizer system for preventing overturning of the vehicle while maintaining the planes of rotation of said principal wheels substantially perpendicular to the ground, said stabilizer system including (a) first and second ground engageable balancing members transversely spaced from said principal wheels at said one side and at the opposite side, respectively, of said support area of the principal wheels so that said vertical plane passing through the center of gravity normally lies between said support area and said first balancing member, (b) first mounting means suspending said first balancing member from said frame and freely permitting limited displacement of said first balancing member relative to said frame in a generally vertical direction between a normal raised position, which said first balancing member occupies when said vertical plane passing through the center of gravity lies at said one side of the support area, and a relatively lowered position to which said first balancing member moves when lateral instability of the vehicle tends to overturn the latter toward the other side of said support area, (c) second mounting means suspending said second balancing member from said frame and permitting displacement of said second balancing member relative to said frame in a generally vertical direction,
(d) actuating means connected to said second mounting means and normally permitting said second balancing member to move freely relative to the frame in a generally vertical direction, said actuating means being power operated to drive said second balancing member downwardly relative to said frame, and
(e) control means for said actuating means, said control means being connected with said first mounting means and causing power operation of said actuating means only when said first balancing member is displaced to said relatively lowered position.

References Cited by the Examiner
UNITED STATES PATENTS

| | | |
|---|---|---|
| 1,242,500 | 10/17 | Wilcox. |
| 2,685,777 | 8/54 | Plas _____ 180—41 X |
| 2,756,062 | 7/56 | Thixton _____ 280—6.1 |
| 2,872,200 | 2/59 | Kroll _____ 280—6.1 |
| 2,909,342 | 10/59 | Maltby _____ 280—6 X |
| 2,933,271 | 4/60 | Maltby _____ 280—6 X |

FOREIGN PATENTS

| | | |
|---|---|---|
| 975,601 | 10/60 | France. |
| 1,118,437 | 3/56 | France. |

A. HARRY LEVY, *Primary Examiner.*

PHILIP ARNOLD, LEO FRIAGLIA, *Examiners.*